Sept. 10, 1963   A. NATHAN ETAL   3,103,583
TRANSISTORIZED ADJUSTABLE FUNCTION GENERATOR
Filed Sept. 2, 1959   2 Sheets-Sheet 1

INVENTORS
AMOS NATHAN
JACOB KATZENELSON
BY
ATTORNEYS

INVENTORS
AMOS NATHAN
JACOB KATZENELSON

United States Patent Office 3,103,583
Patented Sept. 10, 1963

3,103,583
TRANSISTORIZED ADJUSTABLE FUNCTION
GENERATOR
Amos Nathan, Haifa, and Jacob Katzenelson, Tel-Aviv, Israel, assignors to Technion Research and Development Foundation Ltd., Haifa, Israel
Filed Sept. 2, 1959, Ser. No. 837,615
11 Claims. (Cl. 235—197)

This invention pertains to an adjustable electronic generator for a function of one variable. More specifically this invention pertains to a function generator containing one or more channels in which each channel produces a fundamental piecewise-linear function, which is an L function or a Z function, to be defined later, and using transistors in its implementation.

In the field of analog computers, for example, in which the variables of computation are represented by electric potentials, it is often required to produce an arbitrary function of a variable for its instantaneous value. An adjustable function generator realizes the production of such a function and also permits the easy readjustment of said generator for the production of different functions. An interpolating function generator stores the required function values at a plurality of values of the variable and produces an output signal which represents a piecewise-linear approximation to said function.

It is an object of this invention to provide an adjustable interpolating function generator using the special linear and non-linear characteristics of transistors.

It is another object of this invention to provide a channel for a function generator having a transfer characteristic corresponding to an L function, where an L function of $x$, $L(x-x_1)$, is defined as a continuous function which is a constant for values of $x$ on one side of $x=x_1$, where $x_1$ is a constant, and a linear function of $x$ on the other side of $x_1$.

It is another object of this invention to provide a channel for a function generator having a transfer characteristic corresponding to a Z function, $Z(x-x_1)$ which is defined as a continuous function of $x$, linear for $$x_1 \leq x \leq x_{i+1}$$

and constant outside this interval.

It is a further object of this invention to provide an L or a Z channel in a transistorized configuration, having high input and low output impedance and a higher gain than the diode configurations of the prior art.

Further objects and advantages of this invention will become apparent from the following description taken in connection with the accompanying drawings in which, FIGURE 1 is a plot of an L function,
FIGURE 2 is a plot of another example of an L function;
FIGURE 3 is a plot of an transfer characteristic of a function generator produced by the addition of outputs of a plurality of L channels;
FIGURE 4 is a plot of a Z function;
FIGURE 5 is a schematic diagram of a diode L channel of the prior art;
FIGURE 6 is a schematic diagram of one embodiment of an L channel of this invention, corresponding to the L function of FIGURE 1;
FIGURE 7 is a schematic diagram of one embodiment of an L channel of this invention, corresponding to the L function of FIGURE 2;
FIGURE 8 is a plot of output signal versus input signal at the corner of an L function with emitter resistance R as a parameter;
FIGURE 9 is a block diagram of one embodiment of a complete function generator using channels of this invention;

FIGURE 10 is one embodiment of block $A_1$ of FIGURE 9;
FIGURE 11 is one embodiment of block B of FIGURE 9;
FIGURE 12 is another embodiment of an L channel of this invention;
FIGURE 13 is a block diagram of another embodiment of a function generator embodying channels of this invention.

One example of an L function is illustrated in FIGURE 1 in which $L=0$ for $x<x_1$ and L increases linearly with $x$ for $x>x_1$.

Figure 3:
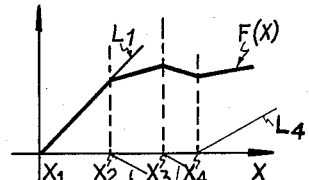
FIGURE 3 shows the combination of L functions, producing by summation the required output function $F(x)$ of the function generator.

Similarly to FIGURE 3, it is possible to produce the required function $F(x)$ by summation of a plurality of suitable Z functions, as has been described in detail by F. H. Raymond et al., in U.S. Patent 2,831,107.

Figure 5:
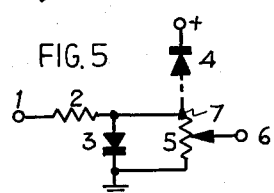

One embodiment of an L channel of the prior art, i.e. a channel for the production of an L function, will be described in connection with FIGURE 5 in which 1 is the input terminal, 2 is a suitable resistor, 3 and 4 are diodes, 4 being connected to a suitable constant positive voltage, and 5, with output terminal 6, is an adjustable potentiometer. Such channels have been described in the above patent and, for example, by Miura et al., in IRE Transactions on Electronic Computers, vol. EC–6, No. 2, June 1957, pp. 95–100. Omitting diode 4, the device of FIGURE 5 is an L channel in which diode 3 produces the constant region of the L function and the adjustment of 5 determines the slope of its other linear region. This circuit produces at 7 an output voltage equal to $$\frac{R_5}{R_2+R_5} v.$$

where $R_2$, $R_5$ are the resistances of 2, 5, respectively, $$\frac{R_5}{R_2+R_5}$$

being the maximum gain of the channel. To provide a convenient input impedance at 1 and to obtain the required constancy of output signal in the constant region, $R_2$ must be fairly large, and the resulting ratio $$\frac{R_5}{R_2+R_5}$$

is usually considerably smaller than unity, which is one disadvantage of the circuit. The output impedance at 6 is of the order of $R_2$ in the sloping region, and may be quite small in the constant region. This behaviour of output impedance is another disadvantage in many applications of such a channel.

Figure 1:
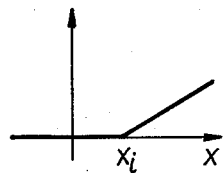

One embodiment of an adjustable L channel, being a function generator for an L function of adjustable corner and slope, will be described in connection with FIGURE 6 in which 10 is the input terminal for a voltage $v_1$, $$v_1 = x - x_1$$

where $x$ is a variable voltage and $x_1$ is a constant voltage. 10 is connected to the base B of PNP transistor 13 through the parallel combination of base resistor 11 and capacitor 12. The collector C of transistor 13 is grounded and its emitter E is connected through resistor 15 to a constant positive potential $+V$ at terminal 14. Potentiometer 16 with adjustable output terminal 18 is connected between E and terminal 17 which is held at a suitable constant potential, which is usually zero or a few millivolts above zero. This circuit produces an L function corresponding to FIGURE 1.

Figure 6:
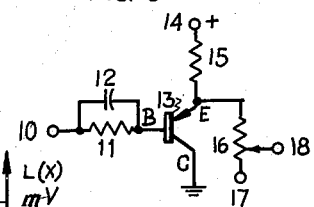

The operation of the circuit of FIGURE 6 is as follows: For voltages $x-x_i<0$, transistor 13 is saturated and its output voltage, at E, is therefore approximately constant. For $x-x_i>0$ the transistor operates as a linear transistor amplifier in a common collector connection. Its gain at terminal E is therefore almost equal to unity, and the gain at output terminal 18 is continuously adjustable between 1 and 0, according to the setting of potentiometer 16.

Figure 2:
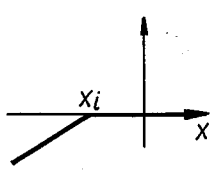
FIGURE 2 is another example of an L function, in which L is a linear function of $x$ for $x<x_1$ and zero for $x>x_1$.
Figure 7:
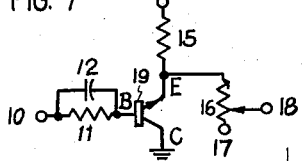

Similarly, FIGURE 7 is a schematic diagram of one embodiment of an L channel corresponding to the L function of FIGURE 2. This embodiment differs from that of FIGURE 6 in the replacement of PNP transistor 13 by NPN transistor 19 and in a reversed sign of the constant potentials at 14 and 17. The operation of this circuit is quite similar to that of the circuit of FIGURE 6 and will therefore not be further described.

Figure 8:
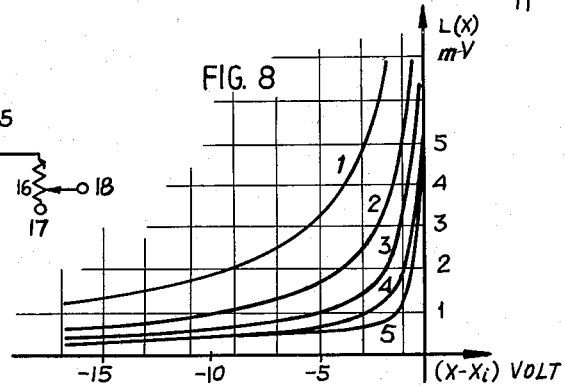

The transfer characteristic of the embodiment of this invention of FIGURE 6 in the region $x-x_i<0$ and near the corner $x=x_i$ will be described more accurately in connection with FIGURE 8 which represents a number of plots of output voltage at E versus $x-x_i$ for one example of this embodiment, in which 11 is 2.2 kiloohms, 13 is a PNP transistor type 2N422, 16 is a potentiometer of 50 kiloohms resistance and 17 is grounded. The voltage of 14 is $V=22.5$ volts. Resistor 15 has resistance R which has the following values Curve number 1, $R=47\ k\Omega$
Curve number 2, $R=100\ k\Omega$
Curve number 3, $R=220\ k\Omega$
Curve number 4, $R=470\ k\Omega$
Curve number 5, $R=1\ m\Omega$ These curves show that the transfer characteristic is not an ideal L function of FIGURE 1. In particular, in the region $x<x_i$ the output is larger than zero and not quite constant. In the region of the corner it is seen that said corner is not sharp, but rounded off. These effects increase with decreasing R. A circuit of the configuration of FIGURE 6 can operate as a so-called emitter follower. In this case a usual value of R in the above circuit would be of the order of 10 to 20 kiloohms, corresponding to considerably larger errors with respect to the curve of FIGURE 1, than curve 1, FIGURE 8.

In function generators embodying a plurality of L channels it is important to use L channels producing an output voltage corresponding very accurately to an ideal L curve. This invention therefore operates with high values of R for resistance 15, such as those corresponding to curves 2–5, FIGURE 8. Moreover it is advantageous to use an embodiment of an L channel such that, for $x<x_i$, output voltage at 18, FIGURE 6, does not depend upon the setting of potentiometer 16. In this case said potentiometer setting does not influence the output voltage of the function generator in regions for which $x<x_i$. In this invention this condition is approximated by the following compensation means: Terminal 17 of potentiometer 16 is connected to a suitable constant positive voltage. For example, if $R=100$ kiloohms, said voltage is of the order of 1 millivolt, and for such a value the average potential difference between the potentials of E and 17 is minimized for $x-x_i<0$, and thus said influence is also minimized. In this method of compensation, the constant region of the L function will be at a small positive voltage.

An alternative method of compensation connects terminal 17, FIGURE 6, to ground, and provides a small negative potential at collector C so that the region of approximately constant output is at zero level, approximately.

Another alternative method of adjusting the slope of said L function uses terminal E, FIGURE 6, as output terminal and input voltage $$v_0 = k(x-x_1)$$

at terminal 10, where $k$ is obtained through the setting of a potentiometer.

Figure 9:
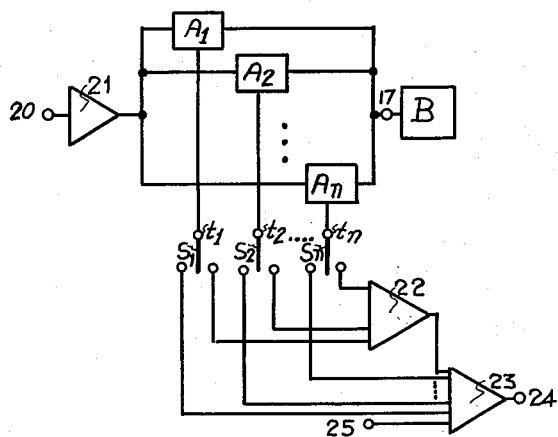

One embodiment of a block diagram of a complete function generator using channels of this invention will be described in connection with FIGURE 9 in which 20 is the input terminal for a potential representing the independent variable $x$, 21 is an impedance converter providing high input impedance at 20 and producing $x$ at a low impedance level at its output terminal, whence it is fed to blocks $A_i$; $i=1, 2, \ldots n$; which are also connected to an adjustable constant potential at 17 which is the output terminal of block B.

$A_i$ produces at its output terminal $t_i$ a suitable L function, whose corner at $x_i$ and whose slope are adjustable. Change-over means $S_i$ connect $t_i$ either to sign changing adder 22 or to sign changing adder 23. 23 is also fed by the output of 22 and by an adjustable constant potential at terminal 25. The setting of $S_i$ permits the L function at $t_i$ or its negative to be added to said output signal according to its setting. At 24 thus appears the required linear combination of L functions producing an output function, such as $F(x)$, FIGURE 3.

Figure 10:
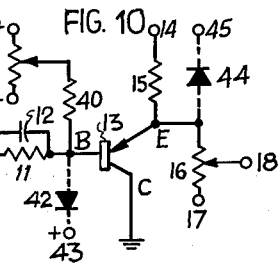

One embodiment of block $A_i$ of FIGURE 9 will be described in connection with FIGURE 10 which is a schematic diagram of one practical circuit based on the circuit of FIGURE 6 and using the same values as FIGURE 6. 10 is the input terminal which is fed with input voltage $x$. Potentiometer 41 is connected between D.C. potentials of plus and minus 110 volts and its adjustable contact is connected through resistor 40 of 22 kiloohms to B. The voltage at B is therefore a linear combination of $x$ and the output voltage of potentiometer 41, said voltage representing $k_1(x-x_1)$ where $k_1$ is nearly unity, when transistor 13 is operating in its linear region. The value of $x_1$, and thus the position of the corner of the L function of this channel, is adjustable through 41. Diodes 42 and 44 and the dash-dot connections of FIGURE 10 do not apply to this example. Terminal C is grounded.

Figure 11:
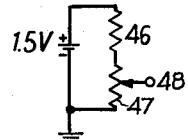

One embodiment of block B of FIGURE 9 will be described in connection with FIGURE 11 which is a schematic diagram of the circuit producing the required constant potential at 17, FIGURE 9. This circuit consists of a voltage source of 1.5 volts, in this example, to which is connected the series combination of resistor 46 (100 kiloohms) and adjustable potentiometer 47 (500 ohms) whose output terminal is 48, thus permitting adjustment of the potential at 17 so as to obtain proper compensation of the L channels.

Figure 12:
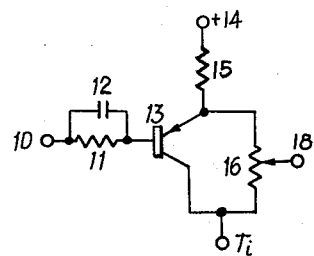

Another example of a circuit for the production of an L function according to this invention will be described in connection with FIGURE 12 in which a voltage $x$ is accepted at terminal 10 and a voltage $x_1$ is accepted at terminal $T_1$. Terminals E and 17 are electrically connected. The circuit values of FIGURE 12 are equal to those of FIGURE 6. This circuit produces an L function whose corner is at $x_1$ and whose constant region corresponds to an output approximately equal to $x_1$ at E. Thus the output voltage at 18 is $x_1$ volts above that of the circuit of FIGURE 6. In this example $x$ and $x_1$ are variable in the range of $-10$ volts to $+10$ volts.

Figure 13:
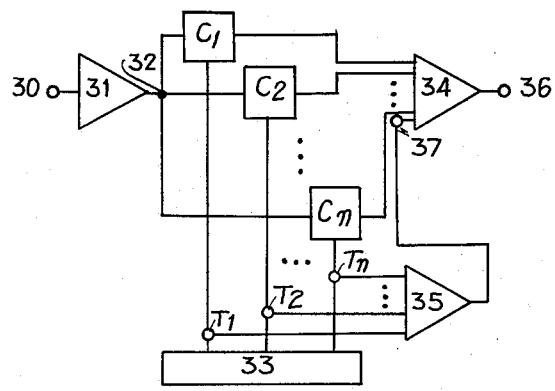

The channel of FIGURE 12 can be used in a function generator one embodiment of which will be described in connection with the block diagram of FIGURE 13 in which voltage $x$ is accepted at terminal 30 and fed to blocks $C_i$; $i=1, 2, \ldots n$. Block 33 produces voltages $x_i$; $i=1, 2, \ldots n$; which are fed to the corresponding blocks $C_i$. $C_i$ produces an L function such as described in connection with FIGURE 12. The output voltages of all blocks $C_i$ are added in adder 34. All voltages $x_i$ are added in sign changer of unit gain 35, whose output voltage, at terminal 37, is fed to 34. The additional voltages $x_1$ produced by blocks $C_1$ are therefore deducted by added 34 and its output, at terminal 36, represents the required output function of the function generator, corresponding to FIGURE 3. The circuit described in connection with FIGURE 12 represents one embodiment of this invention for blocks $C_1$ of FIGURE 13.

Figure 4:
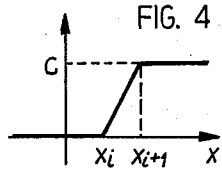
FIGURE 4 is an example of a Z function, in which $Z=0$ for $x<x_1$, and $Z=c$ for $x>x_{i+1}$.

Adjustable function generators comprising Z channels, i.e. channels producing a Z function, such as that of FIGURE 4, for example, have been described by F. H. Raymond et al., as cited above. The block diagrams of FIGURES 9 and 13, for example are suitable for such function generators provided that channels $A_1$ or $C_1$, respectively, are replaced by channels producing suitable Z functions rather than L functions.

Three embodiments of this invention for the production of Z functions, for use in function generators such as that of FIGURE 9, for example, will be described in connection with FIGURE 10. One embodiment uses the circuit of FIGURE 10 as described above with the addition of diode 42 whose anode is connected to base B of transistor 13, and whose cathode is connected to a suitable positive D.C. potential U at terminal 43. 42 acts as a limiting diode, limiting the base potential at B to values smaller than U. For values of base potential below U the channel operates as an L channel. For other values said base potential is held at a constant value, and therefore the output potential of the channel, at 18, is also constant, thus providing the additional corner and constant region, such as that corresponding to $x_{i+1}$ in FIGURE 4, required for a Z characteristic. Referring again to FIGURE 4, the value of C is determined by U. The slope of the output voltage between $x_1$ and $x_{i+1}$ is determined by the setting of potentiometer 16.

A second embodiment of a Z channel of this invention will also be described in connection with FIGURE 10; it omits said diode 42 and uses limiting diode 44 whose anode is connected to the emitter E of transistor 13, and whose cathode is connected to a suitable D.C. potential U' at terminal 45. Said diode directly limits the potential at E to values smaller than or equal to U, thus again providing the additional corner and linear region of a Z function.

A third embodiment of a Z channel of this invention will again be described in connection with FIGURE 10. Said embodiment uses a configuration identical to that of the L channel, i.e. it omits both diodes 42 and 44. Said additional corner and additional linear region of the Z function being produced in this embodiment by driving transistor 13 into cut-off through a suitable choice of emitter resistance 15 and the potential at terminal 14. For example, to obtain at E, FIGURE 10, a value of $c$, FIGURE 4, equal to a maximum of 2 volts, suitable values of 15 and the potential at 14 are of the order of 4 kiloohms and 2 volts, respectively. Said value of $c$ may be changed by adjustment of the potential at 14.

Similarly, circuits such as that of FIGURE 12 can be modified into Z channels, by addition of suitable diodes or by operation into the region of cut-off, and said modifications will be quite clear from the above description. Said modified channels can then be used in function generators as that of FIGURE 13, to provide blocks $C_1$.

It will be apparent that we have provided circuits for the production of suitable fundamental adjustable functions, such that their embodiment in a one-dimensional function generator provides means for the production of piecewise-linear functions. Moreover, such a function generator is readily adjustable so as to produce different functions. The circuits provided use transistor means and take advantage both of the linear and non-linear characteristics of transistors.

Although this invention has been described and illustrated in detail it is to be understood that the same is by way of illustration and example only and is not to be taken by way of limitation, the scope of this invention being limited only by the terms of the appended claims.

What is claimed is:

1. A generator for an L function $L(x-x_1)$, said L function being a continuous function of the variable $x$ and being constant for values of $x$ on one side of $x=x_1$, and a linear function of $x$ on the other side of $x_1$, where $x_1$ is a constant; comprising input means for accepting an input signal representing $x-x_1$; transistor means; impedance means for feeding said input signal to the base of said transistor means, said transistor means being adapted to operate with a suitable emitter current with suitable emitter resistance means connected to suitable constant potential means; producing said L function at the emitter electrode of said transistor means for the instantaneous value of $x$ by driving said transistor means into saturation for producing the constant domain of said L function and operating it linearly for producing the other domain of said L function, said emitter resistance having a substantially high resistance value selected to control said transistor means to generate an output which is linear in the operating range between cutoff and saturation; said constant potential means having a value at least greater than 1.5 times the maximum value signal imposed upon said impedance means; potentiometer means connected to said emitter electrode for adjusting the generator output voltage to generate the desired L function.

2. A generator for an L function $L(x-x_1)$, said L function being defined as a continuous function of the variable and being constant for values of $x$ on one side of $x=x_1$, where $x_1$ is a constant; comprising input means accepting said variable, $x$; suitable means for feeding said input signal to the base of transistor means, said transistor means being operated with suitable emitter current with suitable emitter resistance means connected to suitable constant potential means; means for accepting a signal representing said constant $x_1$ and feeding it to the collector of said transistor means; producing said L function for the instantaneous value of $x$ at the emitter of said transistor means by driving said transistor means into saturation for producing the constant domain of said L function and operating it linearly for producing the other domain of said L function, said emitter resistance having a substantially high resistance value selected to control said transistor means to generate an output which is linear in the operating range between cutoff and saturation; said constant potential means having a value at least greater than 1.5 times the maximum value signal imposed upon said impedance means; potentiometer means connected to said emitter electrode for adjusting the generator output voltage to generate the desired L function.

3. The device as recited in claim 2, comprising adjustable means for adjusting said signal representing $x_1$ connected to said transistor means.

4. The function generator set forth in claim 1 including diode means for limiting said output signal to a suitable value to obtain the second required constant domain of a Z function.

5. The device of claim 4 comprising adjustable means for providing an adjustable potential at said diode means to provide adjustment of said output signal in said second constant domain.

6. The device as recited in claim 5 in which said constant potential means are adjustable.

7. A generator for a Z function of the type set forth in claim 5 further comprising suitable constant potential means connected to said emitter resistance means, for producing said Z function such that its second constant region is produced by driving said transistor means into cut-off.

8. The device as recited in claim 7, comprising in addition adjustable potential dividing means accepting said input signal and a secondary signal, and producing therefrom a suitable fractional signal, for producing as output signal of said generator an L or Z function of adjustable slope.

9. The device as recited in claim 1, comprising in addition suitable constant potential means connected to said potentiometer means such that said adjustable output signal does not depend upon the setting of said adjustable contact in the constant domain of the produced L function in one of the constant domains of the produced Z function.

10. In an adjustable function generator for a piecewise linear function of one variable having means for accepting a signal representing said variable and a plurality of channels for producing a suitable L function, the improvement comprising each of said channels comprising input means for accepting an input signal representing $x - x_1$; transistor means; impedance means for feeding said input signal to the base of said transistor means, said transistor means being adapted to operate with a suitable emitter current with suitable emitter resistance means connected to suitable constant potential means, producing said L function at the emitter electrode of said transistor means for the instantaneous value of $x$ by driving said transistor means into saturation for producing the constant domain of said L function and operating it linearly for producing the other domain of said L function; potentiometer means connected to said emitter electrode for adjusting the generator output voltage to generate the desired L function; additional suitable constant potential means connected to said potentiometer means such that said adjustable output signal does not depend upon the setting of said adjustable contact in the constant domain of the produced L function; summing means accepting said additional constant potentials and producing therefrom a compensating signal; and means for applying said compensating signal to the output signal of said function generator such as to compensate for the non-zero output signal produced in the constant domains of the produced L functions.

11. An adjustable function generator of the type described in claim 10 including the further improvement of second summing means and sign changing means for producing said correcting signal corresponding to the negative of the sum of the collector potentials of said transistor means.

References Cited in the file of this patent

UNITED STATES PATENTS

| 2,851,604 | Clapper | Sept. 9, 1958 |
| 2,905,815 | Goodrich | Sept. 22, 1959 |

OTHER REFERENCES

Miura et al.: A New Diode Function Generator, I.R.E. Transactions on Electronic Computers, June 1957, pp. 95–100.